Aug. 10, 1948.  C. N. HICKMAN  2,446,537
THRUST GAUGE
Filed Nov. 16, 1944
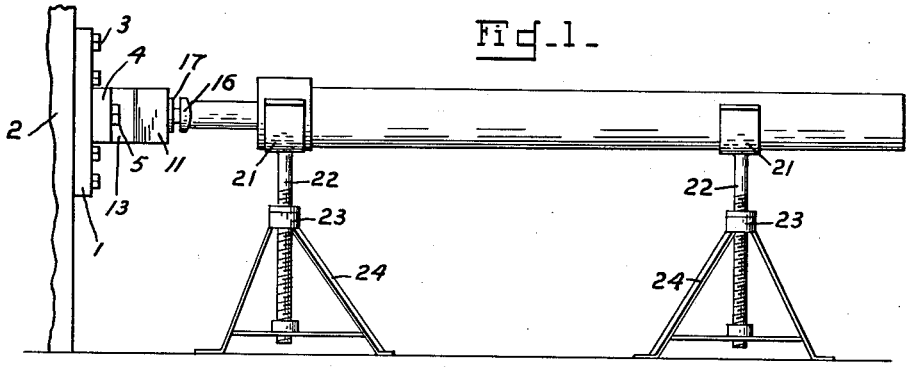
Fig. 1.
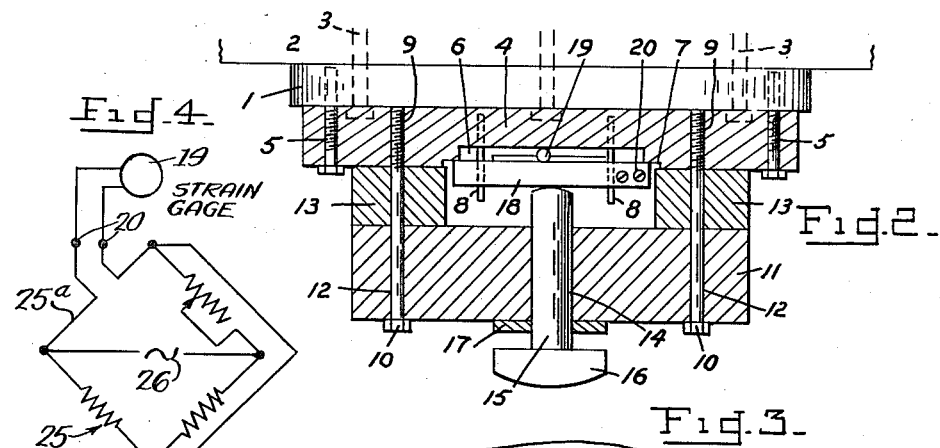
Fig. 2.
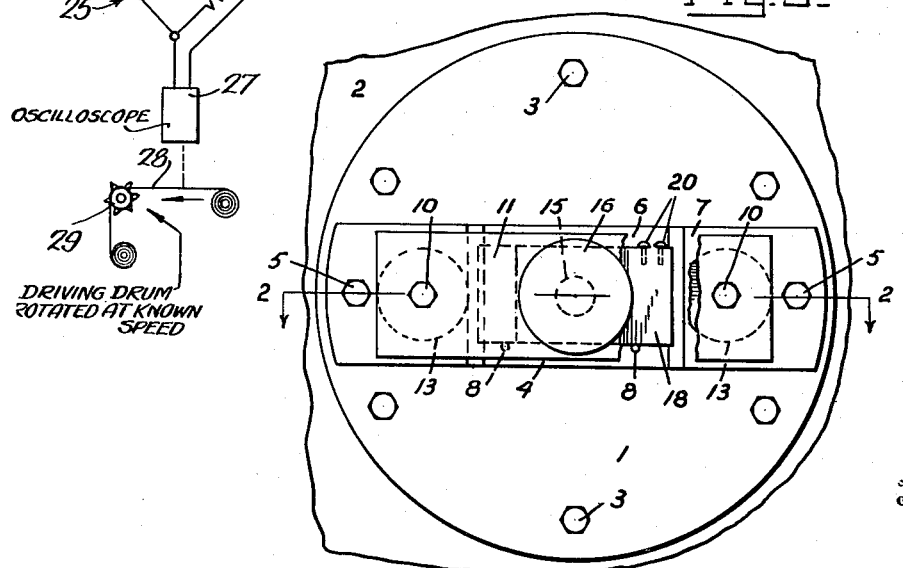
Fig. 3.
Fig. 4.
Inventor
Clarence N. Hickman
By C. E. Herrstrom & H. E. Thibodeau
Attorneys Patented Aug. 10, 1948

2,446,537

UNITED STATES PATENT OFFICE 2,446,537

THRUST GAUGE

Clarence N. Hickman, Jackson Heights, N. Y.

Application November 16, 1944, Serial No. 563,739

5 Claims. (Cl. 73—167)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a thrust gage and recording equipment, particularly for determining the thrust of rocket projectiles as a function of time. The means generally available for making such determinations have been found to be inadequate, since the thrust-time relationships encountered have been somewhat outside the range of available gages and recording devices inasmuch as large forces of very short duration are involved.

Accordingly, it is an object of this invention to provide an improved thrust gage in combination with recording equipment for determining thrust-time curves for thrusts of varying intensity and duration.

A particular object of this invention is to provide means for recording the thrust-time relationship for rocket projectiles.

The specific nature of this invention as well as other objects and advantages thereof will clearly appear from a description of a preferred embodiment as shown in the accompanying drawings in which:

Fig. 1 is a side elevational view of the assembly of the invention.

Fig. 2 is a sectional view on the line 2—2 of Fig. 3 and

Fig. 3 is a front elevational view of the plate assembly.

Fig. 4 is a diagrammatic view of my preferred form of strain measuring and recording means.

The thrust gage assembly, Fig. 1, consists of a circular base plate 1 which is mounted in a vertical position on any solid rigid support, such for example as a masonry foundation wall 2 by lag screws 3. A back plate 4 is attached by bolts 5 in a horizontal position, diametrically across the middle of foundation plate 1. Back plate 4 has a central recess 6 in its forward side arranged to provide shoulders 7 at the edges thereof. A pair of pins 8 are mounted in suitable holes provided in recess 6, said pins projecting outwardly from back plate 4 to serve as mounts for the thrust gage, as will be explained later. A pair of spaced threaded holes 9 are provided in the back plate 4 to receive bolts 10.

A front plate 11 is provided with two holes 12, one near each end to align with holes 9 in back plate 4. Spacer blocks 13 are assembled between front plate 11 and back plate 4, each of the bolts 10 passing thru one of the holes 12 in front plate 11, then thru a spacer 13, and lastly threadably engaging the corresponding hole 9 in back plate 4 to hold front plate 11 and back plate 4 in rigid parallel assembly, as clearly shown in Fig. 2.

Front plate 11 is also provided with a centrally located hole 14 for slidably receiving a plunger 15. Plunger 15 has a flanged head 16 and is assembled with an annular spacer 17 between head 16 and front plate 11.

The thrust gage consists of a steel beam element 18 having an electric resistance strain gage 19 cemented midway along the back surface and electrically connected by suitable wires (not shown) to binding posts 20 which are mounted on the upper edge of beam element 18 and insulated therefrom. In assembly, beam element 18 is supported on pins 8 and abuts shoulders 7 with the electric strain gage 19 in recess 6 and binding posts 20 on top.

Plunger 15 with spacer 17 assembled thereon, is then inserted in hole 14 in front plate 11 to contact beam element 18. Spacer 17 is selected of such thickness that plunger 15 is permitted a free motion equal to twice the displacement of beam element 18 when it is subjected to the maximum expected thrust stress.

In the preferred embodiment, shoulders 7 are spaced four inches apart, however any other distance could have been selected and beam element 18 designed accordingly by application of well known formulae. Beam element 18 is of sufficiently greater length than the distance between the shoulders 7 that a substantial bearing is obtained against each shoulder in all stressed positions of the element.

With the distance of four inches between supports (shoulders 4) selected, the width and thickness of the beam element 18 required for a given maximum thrust can be readily calculated by means of well known formulae. For the purpose of this investigation, four bars were made of 0.3, 0.5, 0.7 and 1.0 inch thickness and 1.75 inch width to take maximum thrusts of 2500, 7500, 15,000 and 30,000 load pounds respectively, with the corresponding deflections of 0.030, 0.018, 0.012 and 0.009 inch at maximum load.

Beam elements exhibit a linear response to thrust, hence their deformation can be plotted on plain rectangular coordinates without conversion. Preferably, the strain gage 19, cemented to beam element 18, is made one leg 25a of a bridge circuit 25 which is supplied with alternating current from source 26 of about 1,000 cycles/sec. frequency. First the bridge is balanced when the unit is free from stress, then the thrust is applied, throwing the bridge circuit out of balance. The resulting current from the unbalanced bridge is applied to an oscilloscope 27 and the beam focused on a film 28 driven from a drum 29 rotating at a known speed.

The speed with which the gage will follow the changes in thrust depends on the strength of the beam element and the mass of the rocket. If a thrust of W lbs. deflects the bar spring thru a distance of $d$ ft., the resulting potential energy of the spring will be $\frac{1}{2}Wd$ ft. lb. If this thrust is suddenly removed, the rocket will be pushed back; and, at the moment when the deflection of the spring reaches zero, the kinetic energy of the rocket would be $\frac{1}{2}MV^2/32$ ft. lbs., where M is the mass of the rocket in pounds and V is its velocity in feet per second. Now this kinetic energy of the rocket must be equal to the potential energy of the spring; that is $$\frac{1}{2} \cdot \frac{MV^2}{32} = \frac{Wd}{2} \quad (1)$$

or solving for V:

$$V = \sqrt{32Wd/M} \quad (2)$$

But the velocity V is also given by $$V = \frac{1}{2} \frac{\pi d}{T} \quad (3)$$

where T (sec) is the time required for the rocket to reach the position where the spring has zero deflection ($T = \frac{1}{4}$ period, and $d$ (ft.) is the distance moved). Equating (2) and (3) and solving for T, we obtain $$\frac{1}{2} \frac{\pi d}{T} = \sqrt{32Wd/M}$$

or $$T = \frac{1}{2}\pi\sqrt{Md/32W} \quad (4)$$

Now considering the worst possible situation, namely, one in which the weakest spring is used with a very heavy rocket, thus M is 50 lb., $d$ is 0.030 in., or 0.0025 ft., and W is 2500 lb. Accordingly, from Eq. 4

$$T = \frac{1}{2}\pi\sqrt{50 \times 0.0025/32 \times 2500} = 0.002 \text{ sec.}$$

Thus, in the worst case, more than 0.002 sec. would be needed for the gage to change from the maximum to zero deflection. Since these conditions are more severe than can occur in practice, as the thrust cannot drop to zero in zero time, the gage will follow the thrust at all times.

In operation, the appropriate thrust gage 19 is set in place in the holder and the lead wires from the oscilloscope are connected to the binding posts 20. A spacer 17 of the proper thickness is assembled on the plunger 15 which is then inserted in the hole 14 in the front plate 11 to contact the beam element 18. The rocket projectile is simply laid, without being strapped down, in two V-shaped mounts 21 which are welded to large studs 22. These studs are fitted into threaded cylinders 23 which are mounted on heavy portable tripods 24. After the height of the rocket has been adjusted by means of these threaded studs so that the axis of the rocket and the plunger 16 are at the same height, the rocket is pushed up against the head of the plunger, in which position the rocket is ready for activation, and accurate measurement of the thrust developed can be accomplished by the device described.

I claim:

1. A thrust gage for determining the thrust of rocket projectiles comprising in combination, a rigidly-supported base member disposed in a vertical position, a back plate mounted in front of said base plate and provided with a recess in its front surface and so formed as to provide oppositely-disposed shoulders, a front plate in fixed relation to said back plate but spaced forwardly therefrom so as to provide a space forwardly of and coincidental with said recess in the back plate, a beam element supported in said space and abutting said shoulders, an electric-resistance-strain gage attached to the rear face of said beam element, a plunger member having a main body portion extending through said front plate and a rear end portion in engagement with said beam element and a forward end portion normally spaced outwardly from the front face of said front plate, a power source, and electrical measuring means electrically connected to said strain gage and said power source.

2. A thrust gage for determining the thrust of rocket projectiles comprising in combination, a base plate mounted in a vertical position on a rigid support, a back plate fixed in front of said base plate and provided with a recess in its front surface and so formed as to provide oppositely-disposed shoulders, a front plate in fixed relation to said back plate, spacer members between said back and front plates and effective to space said plates to provide a space forwardly of and coincidental with said recess in the back plate, a beam element disposed in said space and abutting said shoulders, an electric resistance strain gage attached to the rear face of said beam element, a plunger member extending through said front plate member and having its rear end portion in engagement with said beam element, a power source, and electrical measuring means electrically connected to said strain gage and said power source.

3. A thrust gage for determining the thrust of rocket projectiles comprising in combination, a rigidly-supported base member disposed in a vertical position, a back plate mounted on the forward surface of said base plate and provided with a recess in its forward surface and so formed as to provide oppositely-disposed shoulders, a pair of spaced pins extending forwardly from within said recess and between said shoulders, a pair of spaced spacers held on the forward surface of said back plate at opposite sides of said recess, a front plate in fixed relation to said back plate and bearing on the front surfaces of said spacers, a beam element supported on said pins and in said recess and abutting said shoulders, an electric-resistance-strain gage attached to the rear face of said beam element, a plunger member extending entirely through said front plate so as to engage said beam element and provided with a forward end portion which is normally spaced outwardly from the forward face of said front plate, a power source, and electrical measuring means electrically connected to said strain gage and said power source.

4. A thrust gage for determining the thrust of rocket projectiles comprising in combination, a circular base plate mounted in a vertical position on a rigid support, a back plate fixed in a horizontal position diametrically across the central portion of the base plate, said back plate being provided with a recess in its forward side so formed as to provide oppositely disposed shoulders, a front plate secured to the front of said back plate but spaced therefrom, a beam element supported to extend over and across said recess and abutting said shoulders, an electric resistance strain gage on the rear face of said beam element, a plunger slidably extending through an aperture in said front plate and having a head portion spaced outwardly from said front plate and its inner end portion in engagement with said beam member, and electrical circuit means connecting said strain gage with a source of electrical power.

5. In a thrust gage, a back plate having a depression in its forward face providing spaced shoulders, a beam spanning said depression and resting with its ends upon said shoulders, means restricting movement of said beam to translation in a direction perpendicular thereto and to said plate, a strain gage interposed between said beam and the bottom of said depression, a contact plunger, and means fixedly carried by said back plate mounting said plunger for longitudinal translation only in said direction, the rear end of said plunger being adapted to contact said beam substantially mid-way between its ends.

CLARENCE N. HICKMAN.

REFERENCES CITED

The following references are of record in the file of this patent:

UNITED STATES PATENTS

| Number | Name | Date |
|---|---|---|
| 1,998,450 | Davis | Apr. 23, 1935 |
| 2,047,193 | Currier | July 14, 1936 |
| 2,347,188 | Garand | Apr. 23, 1944 |
| 2,362,589 | Simmons, Jr. | Nov. 14, 1944 |